US008670851B2

(12) United States Patent
Lindahl et al.

(10) Patent No.: US 8,670,851 B2
(45) **Date of Patent: *Mar. 11, 2014**

(54) EFFICIENT TECHNIQUES FOR MODIFYING AUDIO PLAYBACK RATES

(75) Inventors: Aram Lindahl, Menlo Park, CA (US); Joseph Mark Williams, Dallas, TX (US)

(73) Assignee: Apple Inc, Cupertino, CA (US)

( * ) Notice: Subject to any disclaimer, the term of this patent is extended or adjusted under 35 U.S.C. 154(b) by 694 days.

This patent is subject to a terminal disclaimer.

(21) Appl. No.: 12/647,234

(22) Filed: Dec. 24, 2009

(65) Prior Publication Data

US 2010/0100212 A1 Apr. 22, 2010

Related U.S. Application Data

(63) Continuation of application No. 11/097,778, filed on Apr. 1, 2005, now Pat. No. 7,664,558.

(51) Int. Cl.
*G06F 17/00* (2006.01)

(52) U.S. Cl.
USPC ........................................................ 700/94

(58) Field of Classification Search
USPC .............. 700/94; 84/605, 606, 607, 612, 636, 84/652, 668; 369/124.08
See application file for complete search history.

(56) References Cited

U.S. PATENT DOCUMENTS

| | | | | |
|---|---|---|---|---|
| 6,169,240 | B1 | 1/2001 | Suzuki | |
| 6,292,454 | B1 | 9/2001 | Hu | |
| 6,360,198 | B1 | 3/2002 | Imai et al. | |
| 6,377,931 | B1 * | 4/2002 | Shlomot | 704/503 |
| 6,484,137 | B1 | 11/2002 | Taniguchi et al. | |
| 6,944,510 | B1 * | 9/2005 | Ballesty et al. | 700/94 |
| 6,999,922 | B2 | 2/2006 | Boillot et al. | |
| 7,521,623 | B2 | 4/2009 | Bowen | |

* cited by examiner

*Primary Examiner* — Joseph Saunders, Jr.
(74) *Attorney, Agent, or Firm* — Blakely, Sokoloff, Taylor & Zafman LLP

(57) ABSTRACT

Improved techniques for modifying a playback rate of an audio item (e.g., an audio stream) are disclosed. As a result, the audio item can be played back faster or slower than normal. The improved techniques are resource efficient and well suited for audio items containing speech. The resource efficiency of the improved techniques make them well suited for use with portable media devices, such as portable media players.

20 Claims, 7 Drawing Sheets

EFFICIENT TECHNIQUES FOR MODIFYING AUDIO PLAYBACK RATES

CROSS-REFERENCE TO RELATED APPLICATIONS

This application is a continuation of and claims priority under 35 USC §120 to U.S. patent application Ser. No. 11/097,778 filed Apr. 1, 2005 by Lindahl et al. issued as U.S. Pat. No. 7,664,558 on Feb. 16, 2010.

This application is related to U.S. patent application Ser. No. 10/997,479, filed Nov. 24, 2004, now U.S. Pat. No. 7,521, 623 issued Apr. 21, 2009 and entitled "MUSIC SYNCHRONIZATION ARRANGEMENT," which is hereby incorporated herein by reference.

BACKGROUND OF THE INVENTION

1. Field of the Invention

The present invention relates to audio playback and, more particularly, to efficient playback rate adjustment on a portable media device.

2. Description of the Related Art

It is well known that previously recorded audio files can be played back on an audio device. Typically, the audio playback is done at the same rate that the media was recorded. However, in some situations, it is desirable to speed up the playback rate or slowdown the playback rate. For example, it may be helpful to a user of the audio device to speed up the playback rate when the user is scanning an audio recording of a previously attended meeting. On the other hand, if the user of the audio device has difficulty understanding the audio recording, the playback rate could be slowed. As an example, if the language of the audio being played back is not the native language of the user, slowing the playback rate can be helpful to the user.

Conventionally, there are various approaches that can be used to provide speed-up or slowdown of audio playback. These conventional approaches involve complicated algorithms, sometimes referred to as time-scaling algorithms. Many of these conventional approaches also undesirably lose the natural cadence associated with speech. These complicated algorithms analyze audio data to determine appropriate frames where time-splicing should occur and then perform the time-splicing of the frames. Other transformation-based analysis approaches offer the promise of high quality results, but are even more computationally intensive. Unfortunately, however, these algorithms consume or require substantial amounts of processing resources, including high performance computational units and substantial amounts of memory. However, with portable audio devices, such as handheld audio players, processing resources are limited. Portable audio players are designed to be small, light-weight and battery powered. Hence, portable audio players are lower performance computing devices than are personal computers, such as desktop computers, which are high performance computing devices as compared to portable audio players. Consequently, the conventional algorithms are not well-suited for execution on portable media players.

Thus, there is a need for improved techniques to facilitate playback rate adjustment on portable media players.

SUMMARY OF THE INVENTION

The invention pertains to improved techniques for modifying a playback rate of an audio item (e.g., an audio stream). As a result, the audio item can be played back faster or slower than normal. The improved techniques are resource efficient and well suited for audio items containing speech. A user interface can facilitate a user's selection of a desired playback rate.

The invention can be implemented in numerous ways, including as a method, system, device, apparatus (including graphical user interface), or computer readable medium. Several embodiments of the invention are discussed below.

As an audio playback system, one embodiment of the invention includes at least: a user interface that enables a user of the audio playback system to specify a particular playback rate that is faster or slower than a normal playback rate; a memory for storage of at least one rate adjustment parameter, the at least one rate adjustment parameter being dependent on the particular playback rate; a processing device operatively connected to the user interface and the memory, the processing device being operable to: receive an input audio stream associated with a normal playback rate, determine the at least one rate adjustment parameter based on the particular playback rate provided via the user interface, store the at least one rate adjustment parameter to the memory, modify the input audio stream in accordance with the at least one rate adjustment parameter to produce an output audio stream associated with the particular playback rate; and an audio output device for facilitating audiblization of the output audio stream.

As a method for altering an audio stream for playback at different rates, one embodiment of the invention includes at least the operations of: receiving a next audio block from an input audio stream having a normal playback rate; incrementing a block count; determining whether the block count equals an overlap frequency; outputting the next audio block as part of an output audio stream without alteration when the block count does not equal the overlap frequency; altering the next audio block to produce an altered audio block when the block count does equal the overlap frequency; and outputting the altered audio block as part of the output audio stream.

As a computer readable medium including at least computer program code for altering an audio stream for playback at different rates, one embodiment of the invention includes at least: computer program code for receiving a next audio block from an input audio stream having a normal playback rate; computer program code for determining whether the next audio block should be altered; computer program code for outputting the next audio block as part of an output audio stream without alteration when the computer program code for determining determines that the next audio block should not be altered; computer program code for altering the next audio block to produce an altered audio block when the determining computer program code for determines that the next audio block should be altered; and computer program code for outputting the altered audio block as part of the output audio stream.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques for modifying a playback rate of an audio item (e.g., an audio stream). As a result, the audio item can be played back faster or slower than normal. A user interface can facilitate a user's selection of a desired playback rate.

The invention is well suited for audio items pertaining to speech, such as audiobooks, meeting recordings, and other speech or voice recordings. The improved techniques are also resource efficient. Given the resource efficiency of these techniques, the improved techniques are also well suited for use with portable electronic devices having audio playback capabilities, such as portable media devices. Portable media devices, such as media players, are small and highly portable and have limited processing resources. Often, portable media devices are hand-held media devices, such as hand-held audio players, which can be easily held by and within a single hand of a user.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
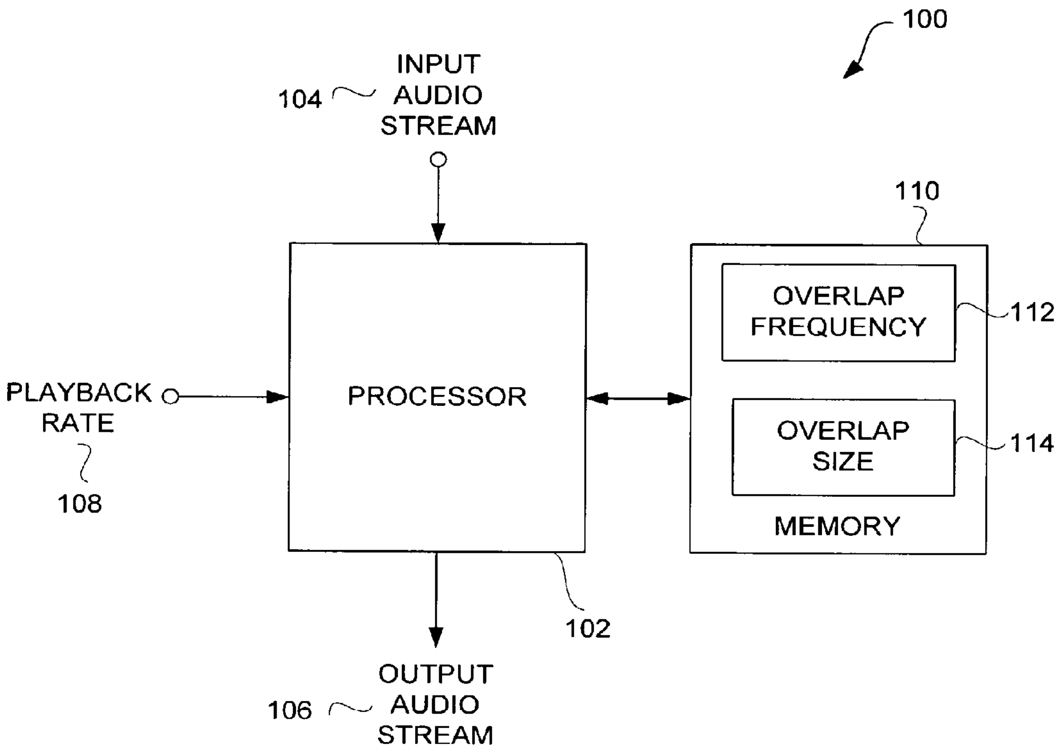
FIG. 1 is a block diagram of an audio playback system according to one embodiment of the invention.

FIG. 1 is a block diagram of an audio playback system 100 according to one embodiment of the invention. The audio playback system 100 includes a processor 102. The processor 102 can be a controller (e.g., microcontroller), microprocessor, or other processing circuitry. The processor 102 receives an input audio stream 104. The audio stream can be obtained from an audio file or from a network connection. The processor 102 efficiently processes the input audio stream 104 and outputs an output audio stream 106. By efficient processing it is meant that for processing portions of the input audio stream, small amounts of processing resources are required. Consequently, the processor 102 need not be a high performance processor and thus can be less expensive and more power efficient. The output audio stream 106 that is produced by the processor 102 can then be played on an output device, such as a speaker. In one embodiment, the output audio stream 106 is delivered to a coder/decoder (CODEC) which produces audio signals that are supplied to a speaker to produce the output audio. In another embodiment, the CODEC can be incorporated into the processor 102. In still another embodiment, the output audio stream 106 is coupled to an audio connector to which an external speaker or headset can be coupled.

In order to process the input audio stream 104, the processor 102 receives a playback rate 108. The playback rate 108 is an indication of a rate by which the input audio stream 104 is to be played back. Typically, the audio playback system 100 is part of a media device that plays audio streams for the benefit of its user. In one embodiment, the user of the media device can interact with the media device to set the playback rate 108. For example, the audio playback system 100 can include a user interface that enables the user to manipulate or set the playback rate 108 to be utilized by the processor 102. In another embodiment, the playback rate 108 could be dynamically determined by the media device itself. For example, the playback rate 108 could be automatically determined based on certain data, type of data, or its mode of operation.

To accommodate the different playback rates, the processor 102 may need to modify the input audio stream 104 in accordance with the playback rate 108. If the playback rate 108 simply requests the normal playback rate, then the processor 102 does not need to modify the input audio stream 104. In such case, the output audio stream 106 can be the same as the input audio stream 104. On the other hand, when the playback rate 108 requests a faster playback rate, the processor 102 modifies the input audio stream 104 to effectively compress the input audio stream 104. In this case, the resulting output audio stream 106 is a compressed version of the input audio stream 104. The compression, however, is performed by the processor 102 in a resource efficient manner. Alternatively, the playback rate 108 can request a slower playback rate. In such a case, the processor 102 modifies the input audio stream 104 to effectively stretch the input audio stream 104. As a result, in this case, the resulting output audio stream is an elongated version of the input audio stream 104.

In one embodiment, in modifying the input audio stream 104, the processor 102 can utilize an overlap technique. In performing the overlap technique, the processor 102 uses at least one overlap parameter stored in a memory 110. The at least one overlap parameter is typically determined by the processor 102 in advance of the processing of the input audio stream 104. More particularly, the at least one overlap parameter is based on the playback rate 108 received by the processor 102. In one embodiment, the at least one overlap parameter can include an overlap frequency 112 and an overlap size 114. As shown in FIG. 1, the overlap frequency 112 and the overlap size 114 can be stored in the memory 110.

Figure 2:
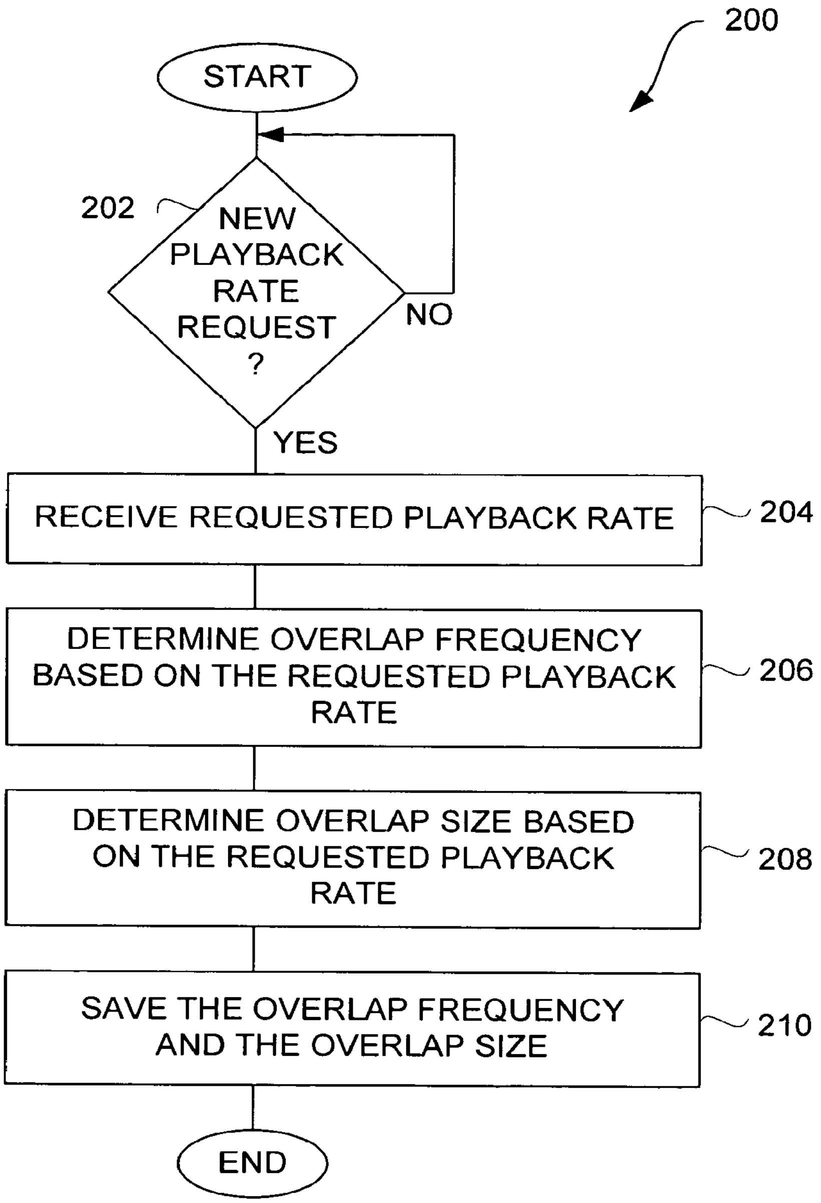
FIG. 2 is a flow diagram of a playback rate change process according to one embodiment of the invention.

FIG. 2 is a flow diagram of a playback rate change process 200 according to one embodiment of the invention. The playback rate change process 200 is, for example, performed by the processor 102 illustrated in FIG. 1. Typically, the processor 102 is part of a media device; hence, the media device can perform the playback rate change process 200.

The playback rate change process 200 begins with a decision 202 that determines whether a new playback rate request has been received. When the decision 202 determines that a new playback rate request has not been received, the playback rate change process 200 awaits such a request. In other words, the playback rate change process 200 is effectively invoked once a new playback rate request is made.

Once the decision 202 determines that a new playback rate request has been received, a requested playback rate is received 204. Typically, the requested playback rate is set by a user of the media device. However, alternatively, the requested playback rate can be sent by a computing device, including either a client machine or a server machine of a client-server computing environment. After the requested playback rate has been received 204, an overlap frequency is determined 206 based on the requested playback rate. In addition, an overlap size is determined 208 based on the requested playback rate. The overlap frequency and the overlap size can, more generally, be considered rate adjustment parameters. Subsequently, the overlap frequency and the overlap size are saved 210. As an example, the overlap frequency and the overlap size can be stored in the memory 110 as shown in FIG. 1. Following the block 210, the playback rate change process 200 is complete and ends.

If the playback rate is an increased rate with respect to the normal rate, then the overlap frequency (OFf) is calculated in accordance with the following equation.

$$OFf=1/(rate-1)$$

where rate is the normalized playback rate (i.e., rate>1). For example, if the rate were 1.2, representing a 20% speed-up, then the overlap frequency (OFf) would be five (5), meaning every fifth audio block would be overlapped. If the overlap frequency (OFf) is not an integer, the integer portion is used.

On the other hand, if the playback rate is a decreased rate with respect to the normal rate, then the overlap frequency (OFs) is calculated in accordance with the following equation.

$$OFs=0.5/((1/rate)-1)$$

where rate is the normalized playback rate (i.e., rate<1). For example, if the rate were 0.8, representing a 20% slow-down, then the overlap frequency (OFs) would be two (2), meaning every second audio block would be overlapped. If the overlap frequency (OFs) is not an integer, the integer portion is used.

Furthermore, the overlap amount of the frame that occurs at the overlap frequency can be adjusted with the next frame to more closely achieve the desired rate. This adjustment can be determined by the following relationships.

If the playback rate is an increased rate with respect to the normal rate, then the overlap size (OSf) is calculated in accordance with the following equation.

$$OSf=(rate-1)OFf$$

where rate is the normalized playback rate (i.e., rate>1) and the overlap frequency (OFf) (integer portion) is calculated as noted above. For example, if the rate were 1.2, representing a 20% speed-up, then the overlap frequency (OFf) as previously noted would be five (5), meaning every fifth audio block would be overlapped. The overlap size (OSf) would be 1, representing a 100% overlap size. As a further example, consider the case where the rate is 1.35 (135%), representing a 35% speed-up, then overlap frequency (OFf) is 2.857. The integer part, i.e., 2, is used as the overlap frequency. However, the remaining fractional portion of the overlap frequency is carried through to affect the overlap size (OSf), which computes to 0.7, representing a 70% overlap.

If the playback rate is a decreased rate with respect to the normal rate, then the overlap size (OSs) is calculated in accordance with the following equation.

$$OSs=1-[((1/rate)-1)OFs]$$

where rate is the normalized playback rate (i.e., rate<1) and the overlap frequency (OFs) (integer portion) is calculated as noted above. For example, if the rate were 0.8 (80%), representing a 20% slowdown, then the overlap frequency (OFs) as previously noted would be two (2), meaning every second audio block would be overlapped. The overlap size (OSs) would be 0.5, representing a 50% overlap size. As a further example, consider the case where the rate is 0.85 (85%), representing a 15% slowdown, then overlap frequency (OFs) is 2.833. The integer part, i.e., 2, is used as the overlap frequency. However, the remaining fractional portion of the overlap frequency is carried through to affect the overlap size (OSs), which computes to 0.647, representing a 64.7% overlap.

Figure 3A:
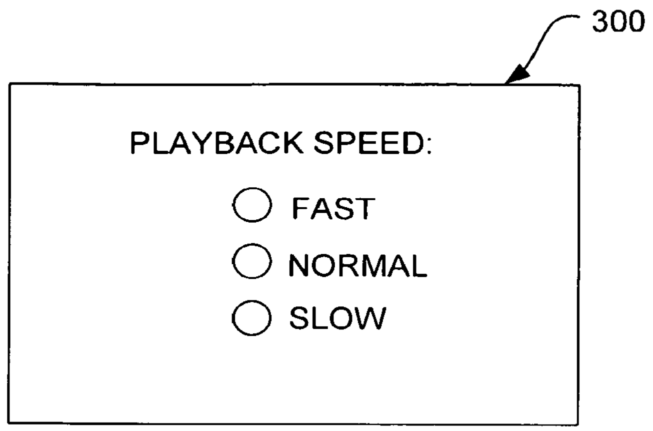
FIGS. 3A and 3B are exemplary display screens suitable for use by a media device to request a new playback rate.
Figure 3B:
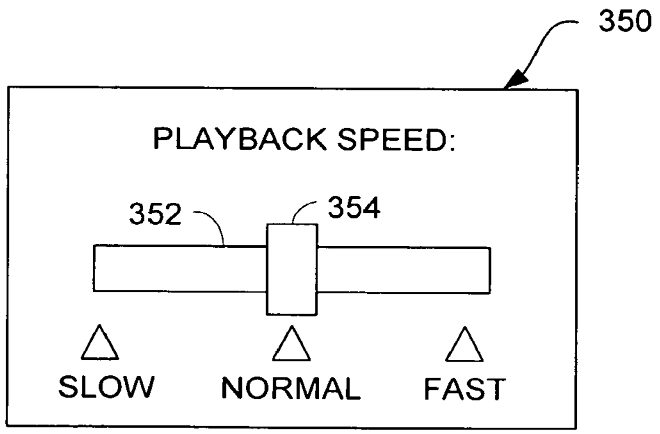

FIGS. 3A and 3B are exemplary display screens suitable for use by a media device to request a new playback rate. Often, the media device is a portable media player that has a hand-held form factor. Typically, the portable media player will include a small display device that provides, together with a user input means, a user interface through which the user can request a new playback rate.

FIG. 3A is an exemplary display screen 300 according to one embodiment of the invention. The display screen 300 can be presented on the display device of the portable media player. The display screen 300 enables a user to select one of three different playback speeds, namely, fast, normal and slow. Normal represents an unaltered playback speed. Fast represented an increased playback speed. Slow represents a slowed playback speed.

FIG. 3B is an exemplary display screen 350 according to another embodiment of the invention. The display screen 350 enables a user to select a playback speed using a slider control 352. The user can manipulate a slider 354 of the slider control 352 to the left to slow the playback rate or to the right to increase the playback rate.

In the case of speech, the playback speed can be increased or slowed only to a limited extent before the speech becomes unintelligible, or otherwise useless, to the user. Hence, the maximum amount of slow-down or speed-up can be limited to a useful range. One example of maximum amounts are 100% speed-up and 100% slow-down. Such maximum amounts may be further limited to more useful limits, such as 50% speed-up and 50% slow-down. However, some applications may further limit the maximum amounts, such as 20% speed-up and 20% slow-down. For example, with respect to the exemplary display screen 300 illustrated in FIG. 3A, with the normal playback rate being normalized to a value of 1.0, the fast playback rate for 20% speed-up can be represented by the value of 1.2 and the slow playback rate can be represented by the value of 0.8 for 20% slow-down.

It should be understood that the playback rate (speed) can be set in alternative ways, some of which do not require the presence of a display device. For example, the user of a portable media player might simply press a button on the portable media player or use a voice-activated command.

Figure 4:
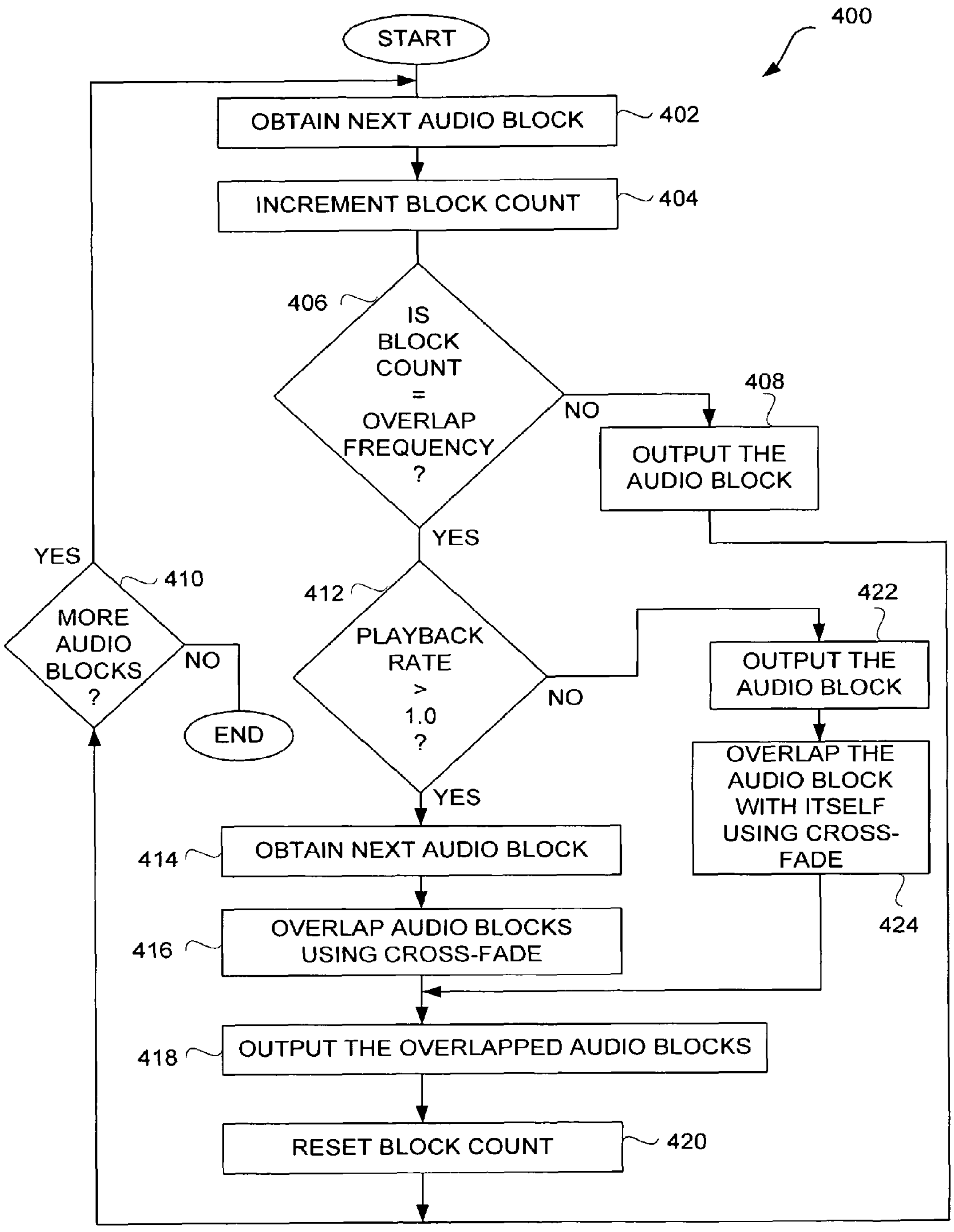
FIG. 4 is a flow diagram of a playback rate adjustment process according to one embodiment of the invention.

FIG. 4 is a flow diagram of a playback rate adjustment process 400 according to one embodiment of the invention. The playback rate adjustment process 400 is, for example, performed by the processor 102 illustrated in FIG. 1. As noted above, the processor 102 is typically part of a media device; hence, the media device performs the playback rate adjustment process 400.

The playback rate adjustment process 400 initially obtains 402 a next audio block. Here, the next audio block represents the next audio block from an input audio stream that contains a plurality of audio blocks. The first next audio block being obtained 402 is the first audio block of the input audio stream, and the last audio block being obtained 402 is the last audio block of the input audio stream. The playback rate adjustment process 400 also keeps a block count of the blocks being processed between overlap operations (discussed below). Hence, a block count is incremented 404 after the next audio block is obtained 402.

Next, a decision 406 determines whether the block count is equal to an overlap frequency. The overlap frequency is a rate adjustment parameter that was previously determined. For example, the overlap frequency can be determined as discussed above with reference to FIG. 2. When the decision 406 determines that the block count is not equal to the overlap frequency, the next audio block is simply output 408. Here, the next audio block being processed is not subjected to any modification but it is instead simply output as part of the output audio stream. In this case, there was no overlap operation imposed on the next audio block because the block count indicated that the next audio block was not to be subjected to modification. Following the block 408, in the decision 410 determines whether there are more audio blocks in the input audio streams be processed. When the decision 410 determines that there are more audio blocks in the input audio stream to be processed, the playback rate adjustment process 400 returns to repeat the block 402 and subsequent blocks so that a next audio block can be similarly processed.

On the other hand, when the decision 406 determines that the block count is equal to the overlap frequency, then additional processing is carried out to modify the audio block. The additional processing begins with a decision 412 that determines whether the playback rate is greater than 1.0. In this embodiment, a playback rate of 1.0 represents no change to the rate, whereas a playback rate greater than 1.0 indicates a rate increase, and whereas a playback rate less than 1.0 indicates a rate decrease. When the decision 412 determines that the playback rate is greater than 1.0, a next audio block is obtained 414 from the input audio stream. The pair of audio blocks are then overlapped 416 using a cross-fade. Next, the overlapped audio block is output 418. In addition, the block count is reset 420 given that the overlap processing has been performed to modified the audio block.

Alternatively, when the decision 412 determines that the playback rate is not greater than one 1.0, the audio block is simply output 422. Note that the audio block being output has not been modified. However, in addition to outputting 422 to the audio block, the audio block is overlapped 424 with itself using cross-fade. Following the block 424, the block count is also reset 420.

Following the block 420, as previously noted, the decision 410 determines whether there are more audio blocks in the input audio streams be processed. When the decision 410 determines that there are more audio blocks in the input audio stream to be processed, the playback rate adjustment process 400 returns to repeat the block 402 and subsequent blocks so that a next audio block can be similarly processed. Alternatively, when the decision 410 determines that there are no more audio blocks in the input audio stream to be processed, the playback rate adjustment process 400 is complete and ends.

Figure 5A:
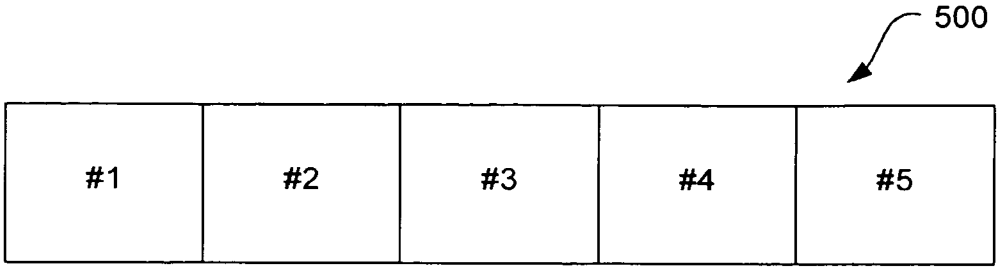
FIGS. 5A-5C are diagrams illustrating exemplary rate adjustment processing according to one embodiment of the invention.
Figure 5B:
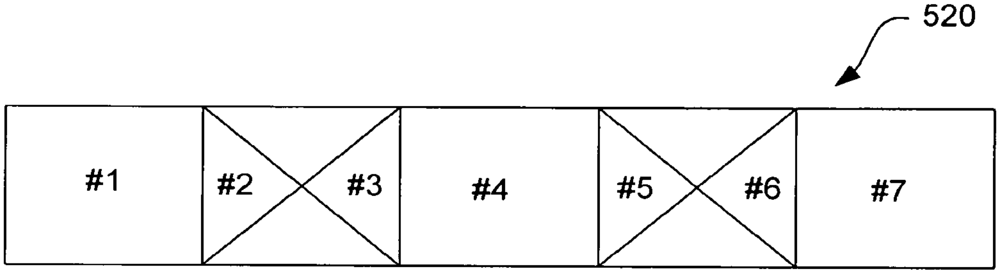
Figure 5C:
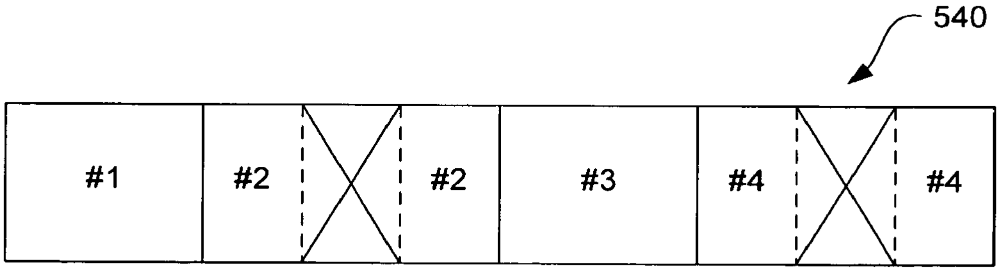

FIGS. 5A-5C are diagrams illustrating exemplary rate adjustment processing according to one embodiment of the invention.

FIG. 5A is a diagram of an exemplary audio stream 500. The exemplary audio stream 500 has a plurality of audio blocks, namely, audio blocks #1, #2, #3, #4 and #5. FIG. 5B is a diagram of an exemplary fast audio stream 520. The exemplary fast audio stream 520 results following playback rate adjustment to increase the playback rate. In this particular example, a 50% speed-up occurs by completely overlapping every second audio block with the subsequent third block. Specifically, audio block #2 is fully overlapped with audio block #3, with audio block #2 being faded-out and audio block #3 being faded-in; and audio block #5 is fully overlapped with audio block #6, with audio block #5 being faded-out and audio block #6 being faded-in. FIG. 5C is a diagram of an exemplary slow audio stream 540. The exemplary slow audio stream 540 results following playback rate adjustment to decrease the playback rate. In this particular example, a 20% slow-down occurs by half-block overlapping every second audio block with itself. Specifically, the later half of audio block #2 is overlapped with itself, with the later half of audio block #2 being faded-out with its overlapping with itself being faded-in; and the later half of audio block #4 is overlapped with itself, with the later half of audio block #4 being faded-out with its overlapping with itself being faded-in.

The cross-fading depicted in FIGS. 5B and 5C is linear fading. However, the fading need not be linear but could instead follow some other shape (i.e., curve). Also the amount of overlap being applied can vary with implementation, though with respect to increasing playback rates of speech-based audio, good results have been obtained when biasing towards full overlaps less often (as opposed to more frequent partial overlaps). For decreasing playback rates of speech-based audio, good results have been obtained when biasing towards 50% overlaps.

Figure 6:
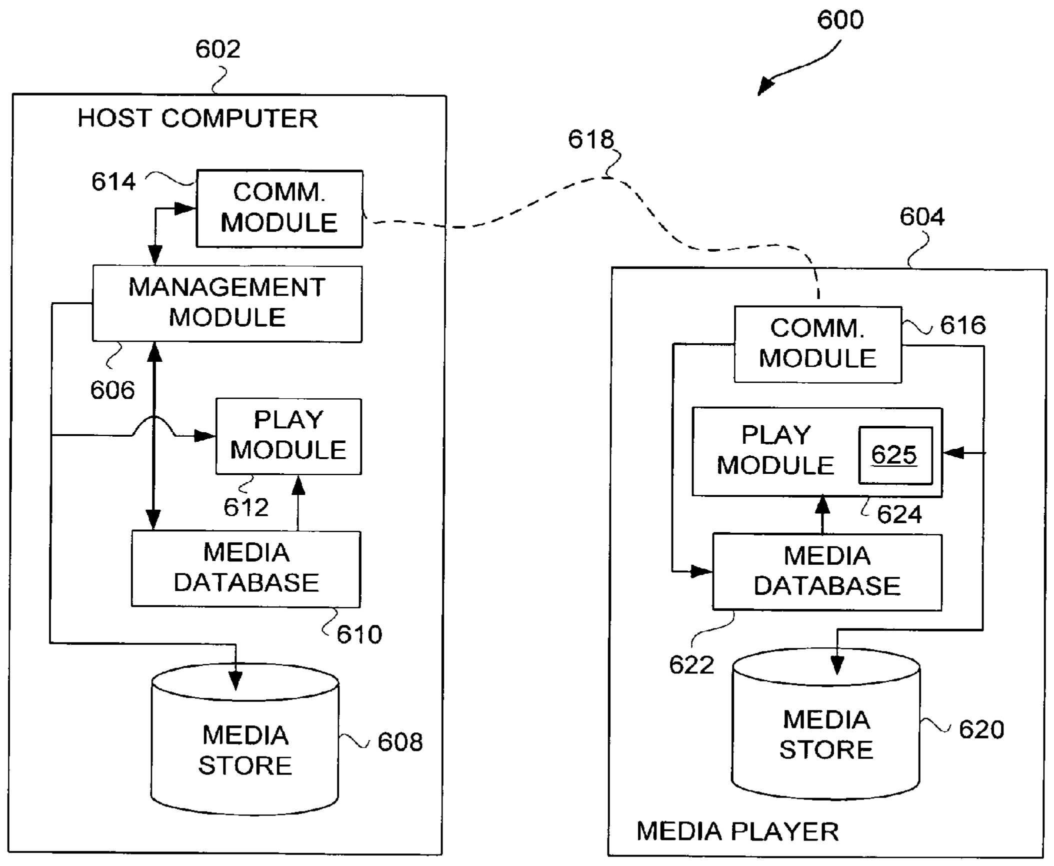
FIG. 6 is a block diagram of a media management system according to one embodiment of the invention.

FIG. 6 is a block diagram of a media management system 600 according to one embodiment of the invention. The media management system 600 includes a host computer 602 and a media player 604. The host computer 602 is typically a personal computer. The host computer, among other conventional components, includes a management module 606 which is a software module. The management module 606 provides for centralized management of media items (and/or playlists) not only on the host computer 602 but also on the media player 604. More particularly, the management module 606 manages those media items stored in a media store 608 associated with the host computer 602. The management module 606 also interacts with a media database 610 to store media information associated with the media items stored in the media store 608.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 602 includes a play module 612. The play module 612 is a software module that can be utilized to play certain media items stored in the media store 608. The play module 612 can also display (on a display screen) or otherwise utilize media information from the media database 610. Typically, the media information of interest corresponds to the media items to be played by the play module 612.

The host computer 602 also includes a communication module 614 that couples to a corresponding communication module 616 within the media player 604. A connection or link 618 removeably couples the communication modules 614 and 616. In one embodiment, the connection or link 618 is a cable that provides a data bus, such as a FIREWIRE™ bus or USB bus, which is well known in the art. In another embodiment, the connection or link 618 is a wireless channel or connection through a wireless network. Hence, depending on implementation, the communication modules 614 and 616 may communicate in a wired or wireless manner.

The media player 604 also includes a media store 620 that stores media items within the media player 604. Optionally, the media store 620 can also store data, i.e., non-media item storage. The media items being stored to the media store 620 are typically received over the connection or link 618 from the host computer 602. More particularly, the management module 606 sends all or certain of those media items residing on the media store 608 over the connection or link 618 to the media store 620 within the media player 604. Additionally, the corresponding media information for the media items that is also delivered to the media player 604 from the host computer 602 can be stored in a media database 622. In this regard, certain media information from the media database 610 within the host computer 602 can be sent to the media database 622 within the media player 604 over the connection or link 618. Still further, playlists identifying certain of the media items can also be sent by the management module 606 over the connection or link 618 to the media store 620 or the media database 622 within the media player 604.

Furthermore, the media player 604 includes a play module 624 that couples to the media store 620 and the media database 622. The play module 624 is a software module that can be utilized to play certain media items stored in the media store 620. The play module 624 can also display (on a display screen) or otherwise utilize media information from the media database 622. Typically, the media information of interest corresponds to the media items to be played by the play module 624. Moreover, the play module 624 can include a rate converter 625. The rate converter 625 can perform rate conversion for media items to be played by the media player 604. For example, the rate converter 625 can correspond to one or more of the audio playback system 100, the playback rate change process 200, and the playback rate adjustment process 400 which were discussed above.

In one embodiment, the media player 604 has limited or no capability to manage media items on the media player 604. However, the management module 606 within the host computer 602 can indirectly manage the media items residing on the media player 604. For example, to "add" a media item to the media player 604, the management module 606 serves to identify the media item to be added to the media player 604 from the media store 608 and then causes the identified media item to be delivered to the media player 604. As another example, to "delete" a media item from the media player 604, the management module 606 serves to identify the media item to be deleted from the media store 608 and then causes the identified media item to be deleted from the media player 604. As still another example, if changes (i.e., alterations) to characteristics of a media item were made at the host computer 602 using the management module 606, then such characteristics can also be carried over to the corresponding media item on the media player 604. In one implementation, the additions, deletions and/or changes occur in a batch-like process during synchronization of the media items on the media player 604 with the media items on the host computer 602.

In another embodiment, the media player 604 has limited or no capability to manage playlists on the media player 604. However, the management module 606 within the host computer 602 through management of the playlists residing on the host computer can indirectly manage the playlists residing on the media player 604. In this regard, additions, deletions or changes to playlists can be performed on the host computer 602 and then by carried over to the media player 604 when delivered thereto.

Figure 7:
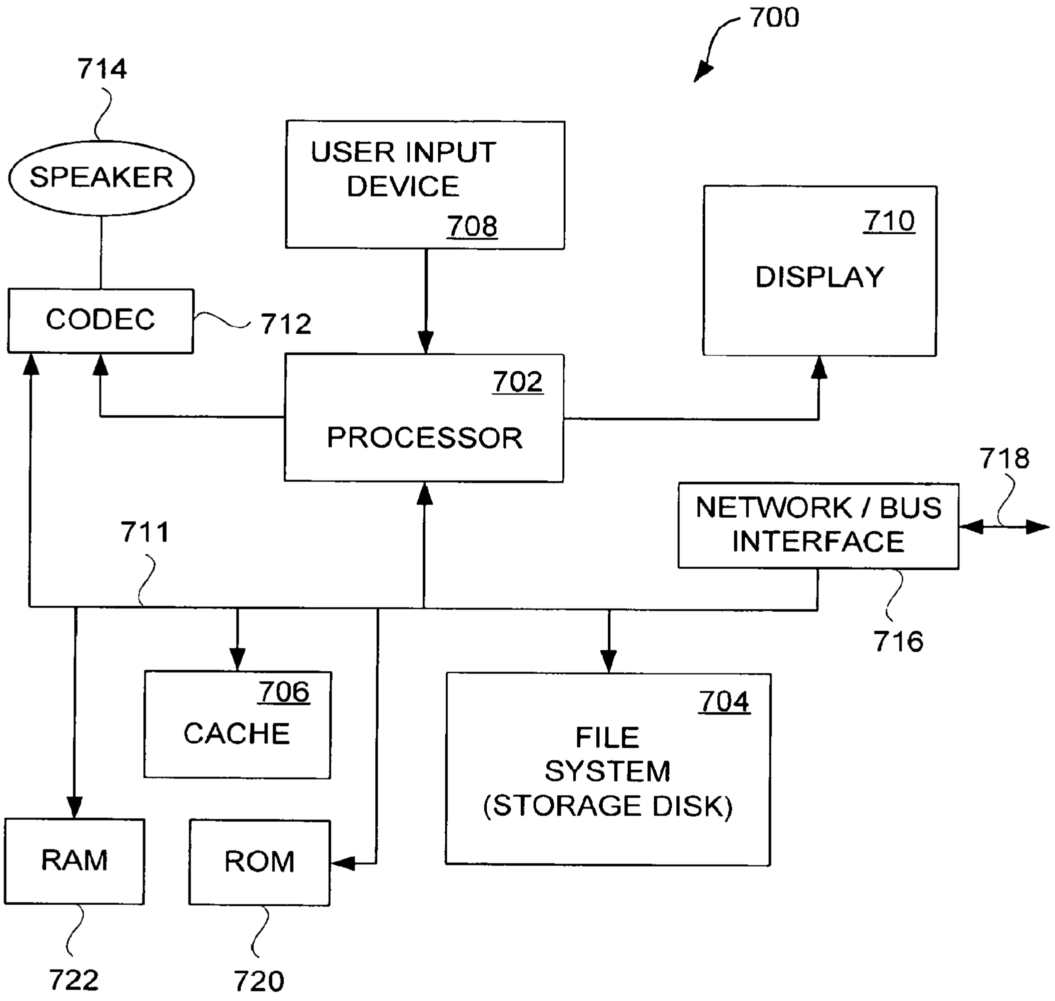
FIG. 7 is a block diagram of a media player according to one embodiment of the invention.

FIG. 7 is a block diagram of a media player 700 according to one embodiment of the invention. The media player 700 includes a processor 702 that pertains to a microprocessor or controller for controlling the overall operation of the media player 700. The media player 700 stores media data pertaining to media items in a file system 704 and a cache 706. The file system 704 is, typically, a storage disk or a plurality of disks. The file system 704 typically provides high capacity storage capability for the media player 700. The file system 704 can store not only media data but also non-media data (e.g., when operated in a disk mode). However, since the access time to the file system 704 is relatively slow, the media player 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is often a concern when the media player 700 is a portable media player that is powered by a battery (not shown). The media player 700 also includes a RAM 722 and a Read-Only Memory (ROM) 720. The ROM 720 can store programs, utilities or processes to be executed in a non-volatile manner. The RAM 722 provides volatile data storage, such as for the cache 706.

The media player 700 also includes a user input device 708 that allows a user of the media player 700 to interact with the media player 700. For example, the user input device 708 can take a variety of forms, such as a button, keypad, dial, etc. Still further, the media player 700 includes a display 710 (screen display) that can be controlled by the processor 702 to display information to the user. A data bus 711 can facilitate data transfer between at least the file system 704, the cache 706, the processor 702, and the CODEC 712.

In one embodiment, the media player 700 serves to store a plurality of media items (e.g., songs) in the file system 704. When a user desires to have the media player play a particular media item, a list of available media items is displayed on the display 710. Then, using the user input device 708, a user can select one of the available media items. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the media player 700 or external to the media player 700. For example, headphones or earphones that connect to the media player 700 would be considered an external speaker.

The media player 700 also includes a network/bus interface 716 that couples to a data link 718. The data link 718 allows the media player 700 to couple to a host computer. The data link 718 can be provided over a wired connection or a wireless connection. In the case of a wireless connection, the network/bus interface 716 can include a wireless transceiver.

One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to utilize and manage media assets. One example of a media management application is iTunes®, version 4.2, produced by Apple Computer, Inc.

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices.

The advantages of the invention are numerous. Different aspects, embodiments or implementations may yield one or more of the following advantages. One advantage of the invention is that processing resources required to implement playback rate adjustment (i.e., timescale modification) can be substantially reduced. A media device is thus able to be highly portable and power efficient. Another advantage of the invention is that the processing performed to implement playback rate adjustment is minimal, on average only a few additional operations per sample in the case of large percentage changes and only fractions of a cycle per sample for large percentage changes. Another advantage of the invention is that the resulting playback rate for resulting output audio can be guaranteed to correspond to a playback rate being requested. Still another advantage of the invention is that where the input audio is speech related, though undesired artifacts can result (as in any time-scale modification), the natural cadence of the speech can be preserved and the speech can maintain its intelligibility despite a wide range of timescale modification.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing resource efficient method for playing back a data stream formed of data blocks at a selected playback rate SPR, the method comprising:

- determining a minimum frequency of data blocks for modification to achieve the selected playback rate SPR;
- computing a data block modification period based upon the minimum frequency;
- receiving the data stream;
- passing through data blocks of the received data stream until an occurrence of the data block modification period occurs; and
- modifying a current data block corresponding to the occurrence of the data block modification period, wherein the selected playback rate SPR is no more than twice a normal playback rate NPR, and wherein the modifying the current data block corresponding to the occurrence of the data block modification period, comprises:
  - if a ratio of the SPR to the NPR is greater than 1.0, cross-fading the current data block with a next data block in the data stream; and
  - if a ratio of the SPR to the NPR is less than 1.0, then cross-fading the current data block with itself.

2. The method as recited in claim 1, wherein the data stream is an audio stream and wherein the data block is an audio frame.

3. The method as recited in claim 1, wherein the selected playback rate is manually provided by a user.

4. The method as recited in claim 1, wherein the selected playback rate is automatically provided based upon a type of data corresponding to the data stream.

5. The method of claim 1, wherein cross-fading the current data block with the next data block comprises the current data block being faded-out and the next data block being faded-in; and wherein cross-fading the current data block with itself comprises a later half of the current data block being faded out while an earlier half of the current data block is being faded in.

6. The method of claim 1, wherein modifying the current data block comprises modifying every Nth data block of the data blocks, wherein N is an integer value corresponding to an integer portion of the data block modification period; and wherein if the ratio of the SPR to the NPR is greater than 1.0, then the data block modification period is equal to 1/((SPR/NPR)-1), and if the ratio of the SPR to the NPR is less than 1.0, then the data block modification period is equal to 0.5/((1/(SPR/NPR))-1).

7. A computing device comprising:

- a data storage unit, the data storage unit arranged to store at least a data stream formed of data blocks, the data stream including audio files formed of a plurality of audio frames; and
- a processor connected to the data storage unit, wherein the processor is configured to playback a data stream received from the data storage at a selected playback rate SPR by:
- determining a minimum frequency of data blocks for modification to achieve the selected playback rate SPR, computing a data block modification period based upon the minimum frequency, receiving the data stream, passing through data blocks of the received data stream until an occurrence of the data block modification period occurs, and modifying a current data block corresponding to the occurrence of the data block modification period, wherein the selected playback rate SPR is no more than twice a normal playback rate NPR, and wherein the modifying the current data block corresponding to the occurrence of the data block modification period, comprises:
  - if a ratio of the SPR to the NPR is greater than 1.0, cross-fading the current data block with a next data block in the data stream; and
  - if a ratio of the SPR to the NPR is less than 1.0, then cross-fading the current data block with itself.

8. The computing device as recited in claim 7, wherein the data stream is an audio stream and wherein the data block is an audio frame.

9. The computing device as recited in claim 7, wherein the selected playback rate is manually provided by a user.

10. The computing device as recited in claim 7, wherein the selected playback rate is automatically provided based upon a type of data corresponding to the data stream.

11. The computing device of claim 7, wherein cross-fading the current data block with the next data block comprises the current data block being faded-out and the next data block being faded-in; and wherein cross-fading the current data block with itself comprises a later half of the current data block being faded out while an earlier half of the current data block is being faded in.

12. The computing device of claim 7, wherein modifying the current data block comprises modifying every Nth data block of the data blocks, wherein N is an integer value corresponding to an integer portion of the data block modification period; and wherein if the ratio of the SPR to the NPR is greater than 1.0, then the data block modification period is equal to 1/((SPR/NPR)-1), and if the ratio of the SPR to the NPR is less than 1.0, then the data block modification period is equal to 0.5/((1/(SPR/NPR))-1).

13. The computing device as recited in claim 7, wherein the computing device is a portable media player.

14. The computing device as recited in claim 13 wherein the portable media player further comprises:

- a display device;
- a user interface presented to a user of the portable media player on the display device, wherein the user uses the user interface to provide the selected playback rate SPR.

15. Non-transitory computer readable medium including at least computer program code for playing back a data stream formed of data blocks at a selected playback rate SPR, the computer readable medium comprising:

computer code for determining a minimum frequency of data blocks for modification to achieve the selected playback rate SPR;

computer code for computing a data block modification period based upon the minimum frequency;

computer code for receiving the data stream;

computer code for passing through data blocks of the received data stream until an occurrence of the data block modification period occurs; and computer code for modifying a current data block corresponding to the occurrence of the data block modification period, wherein the selected playback rate SPR is no more than twice a normal playback rate NPR, and wherein the computer code for modifying the current data block corresponding to the occurrence of the data block modification period, comprises:

computer code for cross-fading the current data block with a next data block in the audio stream if a ratio of the SPR to the NPR is greater than 1.0; and computer code for cross-fading the current data block with itself if a ratio of the SPR to the NPR is less than 1.0.

16. The computer readable medium as recited in claim 15, wherein the data stream is an audio stream and wherein the data block is an audio frame.

17. The computer readable medium as recited in claim 15, wherein the selected playback rate is manually provided by a user.

18. The computer readable medium as recited in claim 15, wherein the selected playback rate is automatically provided based upon a type of data corresponding to the data stream.

19. The computer readable medium of claim 15, wherein cross-fading the current data block with the next data block comprises the current data block being faded-out and the next data block being faded-in; and wherein cross-fading the current data block with itself comprises a later half of the current data block being faded out while an earlier half of the current data block is being faded in.

20. The computer readable medium of claim 15, wherein modifying the current data block comprises modifying every Nth data block of the data blocks, wherein N is an integer value corresponding to an integer portion of the data block modification period; and wherein if the ratio of the SPR to the NPR is greater than 1.0, then the data block modification period is equal to 1/((SPR/NPR)-1), and if the ratio of the SPR to the NPR is less than 1.0, then the data block modification period is equal to 0.5/((1/(SPR/NPR))-1).

* * * * *

UNITED STATES PATENT AND TRADEMARK OFFICE

CERTIFICATE OF CORRECTION

PATENT NO. : 8,670,851 B2
APPLICATION NO. : 12/647234
DATED : March 11, 2014
INVENTOR(S) : Aram Lindahl and Joseph Mark Williams It is certified that error appears in the above-identified patent and that said Letters Patent is hereby corrected as shown below:

On the Title Page

Item 73, delete “Apple Inc,” and substitute – Apple Inc., –.

Signed and Sealed this
Sixteenth Day of September, 2014

Michelle K. Lee

Michelle K. Lee
*Deputy Director of the United States Patent and Trademark Office*